US008701597B2

(12) United States Patent
Maupin et al.

(10) Patent No.: US 8,701,597 B2
(45) Date of Patent: *Apr. 22, 2014

(54) APPARATUS FOR APPLYING CHEMICALS TO RODENTS

(75) Inventors: Gary O. Maupin, Cape Coral, FL (US); Marc C. Dolan, Wellington, CO (US); Nicholas Hamon, Sparta, NJ (US); Eric J. Snell, Barnesville, GA (US)

(73) Assignees: Centers for Disease Control and Prevention, Atlanta, GA (US); Bayer Cropscience S.A., Lyons (FR); B&G Equipment Company, Inc., Jackson, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/252,111

(22) Filed: Oct. 3, 2011

(65) Prior Publication Data
US 2012/0222628 A1    Sep. 6, 2012

Related U.S. Application Data

(60) Division of application No. 12/586,171, filed on Sep. 16, 2009, now Pat. No. 8,028,661, which is a continuation of application No. 11/641,283, filed on Dec. 19, 2006, now abandoned, which is a continuation of application No. 10/690,411, filed on Oct. 21, 2003, now Pat. No. 7,156,052, which is a continuation of application No. 10/282,853, filed on Oct. 28, 2002, now abandoned, which is a continuation of application No. 09/595,034, filed on Jun. 16, 2000, now abandoned.

(51) Int. Cl.
*A01K 13/00*    (2006.01)

(52) U.S. Cl.
USPC .................... 119/661; 119/602; 119/650

(58) Field of Classification Search
USPC ......... 119/602–605, 622, 650, 652, 661, 660, 119/651; 160/179; 43/124, 131
See application file for complete search history.

(56) References Cited

U.S. PATENT DOCUMENTS

| 416,951 A | 12/1889 | Roop |
| 487,433 A | 12/1892 | Crawford |
| 987,433 A | 3/1911 | Crawford |
| 1,569,904 A | 1/1926 | Wright |

(Continued)

FOREIGN PATENT DOCUMENTS

| EP | 0295117 | 12/1988 |
| WO | WO 97/12521 | 4/1997 |
| WO | WO 98/02042 | 1/1998 |
| WO | WO 98/42191 | 10/1998 |

OTHER PUBLICATIONS

Barnes and Kartman, "Control of Plague Vectors on Diurnal Rodents in the Sierra Nevada of California by Use of Insecticide Bait-Boxes," *J. Hyg., Camb.*, 58:347-355 (1960).

(Continued)

*Primary Examiner* — Kimberly Berona
(74) *Attorney, Agent, or Firm* — Klarquist Sparkman, LLP

(57) ABSTRACT

An enclosure is provided having openings for entry of rodents within the enclosure. There is arranged one or more applicators in the form of a suspended flexible web configured to contact rodents entering the chamber and having a chemical on the web for application to the rodents.

7 Claims, 4 Drawing Sheets

(56) References Cited

U.S. PATENT DOCUMENTS

| | | | |
|---|---|---|---|
| 1,582,144 A | | 4/1926 | Pflaum |
| 1,999,122 A | * | 4/1935 | Clark et al. .................. 119/660 |
| 2,316,932 A | | 4/1943 | Bruce |
| 2,702,020 A | * | 2/1955 | Worden .......................... 119/656 |
| 2,925,065 A | | 2/1960 | Worden |
| 3,055,340 A | | 9/1962 | Davis |
| 3,071,111 A | * | 1/1963 | Hamilton ...................... 119/656 |
| 3,116,717 A | | 1/1964 | Ragsdale |
| 3,285,231 A | | 11/1966 | Johnson |
| 3,364,900 A | | 1/1968 | Knapp |
| 3,902,461 A | | 9/1975 | Cortner |
| 4,074,659 A | | 2/1978 | Mowbray et al. |
| 4,281,471 A | | 8/1981 | Jenkins et al. |
| 4,324,202 A | | 4/1982 | Stonestreet et al. |
| 4,662,104 A | | 5/1987 | Mather et al. |
| 4,753,032 A | | 6/1988 | Sherman |
| 5,027,548 A | | 7/1991 | Anderson |
| 5,027,747 A | | 7/1991 | Talley |
| 5,232,940 A | | 8/1993 | Hatton et al. |
| 5,272,832 A | * | 12/1993 | Marshall et al. ................. 43/131 |
| 5,367,983 A | | 11/1994 | Pound et al. |
| 5,447,122 A | | 9/1995 | Cortner |
| 5,448,852 A | * | 9/1995 | Spragins et al. ................. 43/131 |
| 5,542,463 A | | 8/1996 | Pinkalla et al. |
| 5,575,239 A | | 11/1996 | Bradburn et al. |
| 5,806,237 A | * | 9/1998 | Nelson et al. ................... 43/131 |
| 5,932,437 A | | 8/1999 | Poche |
| 5,983,558 A | * | 11/1999 | Las et al. ........................ 43/131 |
| 6,096,329 A | | 8/2000 | Jeannin |
| 6,162,820 A | | 12/2000 | Jeannin et al. |
| 6,395,765 B1 | | 5/2002 | Etchegaray |
| 6,849,266 B2 | | 2/2005 | Maupin et al. |
| 7,156,052 B2 | | 1/2007 | Maupin et al. |
| 7,166,294 B2 | | 1/2007 | Maupin et al. |
| 7,195,756 B2 | | 3/2007 | Maupin et al. |
| 2003/0087800 A1 | | 5/2003 | Maupin et al. |
| 2003/0134877 A1 | | 7/2003 | Maupin et al. |
| 2004/0244717 A1 | | 12/2004 | Maupin et al. |
| 2004/0253725 A1 | | 12/2004 | Maupin et al. |
| 2006/0004060 A1 | | 1/2006 | Maupin et al. |

OTHER PUBLICATIONS

Barnes, "Surveillance and Control of Bubonic Plague in the United States," *Symp. Zool. Soc. Lond.*, 50:237-270 (1982).

Gage et al., "Flea (Siphonaptera: Ceratophyllidae, Hystrichopsyllidae) and Tick (Acarina: Ixodidae) Control on Wood Rats Using Host-Targeted Liquid Permethrin in Bait Tubes," *J. Med Entomol.* 34(1):46-51 (1997).

Hunter et al., "A Comparison of the Tick Efficacy of Frontline Spray Treatment Against the American Dog Tick and Brown Dog Tick," Abstract *Proc. Am. Assoc. Vet. Parasitol.* (41 Meet., 51, 1996).

Kartman, "An Insecticide-Bait Box Method for Plague Control in Certain Areas of the Pacific Region," *Proceedings of the Ninth Pacific Science Congress*, 19:49-52 (1957).

Kartman, "An Insecticide-Bait-Box Method for the Control of Sylvatic Plague Vectors," *J. Hyg.*, 56:455-465 (1958).

Kartman, "Further Observations on an Insecticide-bait-box Method for the Control of Sylvatic Plague Vectors; Effect of Prolonged Field Exposure to DDT Powder," *J. Hyg. Camb.*, 58:119-124 (1960).

Lane et al., "Modified bait tube controls disease-carrying ticks and fleas," *California Agriculture*, 52(2):cover page and pp. 3, 43-48 (1998).

Maupin et al., "Laboratory and Field Evaluation of Rodent-Target Acaricides for Controlling Ixodes ssp," poster presentation of VII International Conference on Lyme Borreliosis and Other Emerging Tick-Borne Diseases, Munich, Germany, presented Jun. 22, 1999.

Morris et al., "Design and Evaluation Criteria for Development of Toxic Wicks for Rodent Control," *Vertebrate Pest Control and Management Materials: Fourth Symposium*, ASTM STP 917, D.E. Kaukeinen, Ed., American Society for Testing and Materials, Philadelphia, pp. 165-182 (1983).

Sonenshine and Haines, "A Convenient Method of Controlling Populations of the American Dog Tick, Dermacentor Variabilis (Acari: Ixodidae), In the Natural Environment," *J. Med. Entomol.*, 22(5):577-583 (1985).

The Maxforce Tick Management System and its Role in Reducing the Incidence of Lyme Disease, National Conference on Ruban Entomology, May 20, 2004.

Slides presented at oral presentations by inventors or their assistants prior to Jun. 16, 1999.

Cover page and pp. 1, 5 and 16 of booklet prepared by American Lyme Disease Foundation, Inc., including abstract of presentation given by inventor Gary O. Maupin on Mar. 8, 1999 (date of booklet unknown).

Portion of the file history for copending U.S. Appl. No. 11/219,254.

Bait. (n. d.). Dictionary.com Unabridged (v 1.1). Retrieved Jan. 31, 2008, from Dictionary.com website: http://dictionary.reference.com/browse/bait.

* cited by examiner

APPARATUS FOR APPLYING CHEMICALS TO RODENTS

This is a divisional of U.S. patent application Ser. No. 12/586,171, filed Sep. 16, 2009, now U.S. Pat. No. 8,028,661 which is a continuation of U.S. patent application Ser. No. 11/641,283, filed Dec. 19, 2006 (abandoned), which is a continuation of U.S. patent application Ser. No. 10/690,411, filed Oct. 21, 2003, issued as U.S. Pat. No. 7,156,052, which is a continuation of U.S. patent application Ser. No. 10/282,853, filed Oct. 28, 2002 (abandoned), which is a continuation of U.S. patent application Ser. No. 09/595,034, filed Jun. 16, 2000 (abandoned), all of which are hereby incorporated by reference.

BACKGROUND OF THE INVENTION

This invention relates to an apparatus for treating rodents particularly wild rodents with a chemical substance. In some instances, treatment of wild rodents can be beneficial to the public health. It is an object of the invention to provide an apparatus that can be placed in an outdoor area to treat wild rodents in the area with a chemical substance.

SUMMARY OF THE INVENTION

According to the invention there is provided an apparatus for applying a chemical to rodents. The apparatus includes an enclosure having at least one peripheral opening for allowing entrance of rodents into the enclosure. The enclosure includes at least one applicator in the form of a suspended flexible web arranged to contact rodents entering the chamber and having the chemical on the web.

For a better understanding of the present invention, together with other and further objects, reference is made to the following description, taken in conjunction with the accompanying drawings, and its scope will be pointed out in the appended claim.

DESCRIPTION OF THE PREFERRED EMBODIMENT

Figure 1:
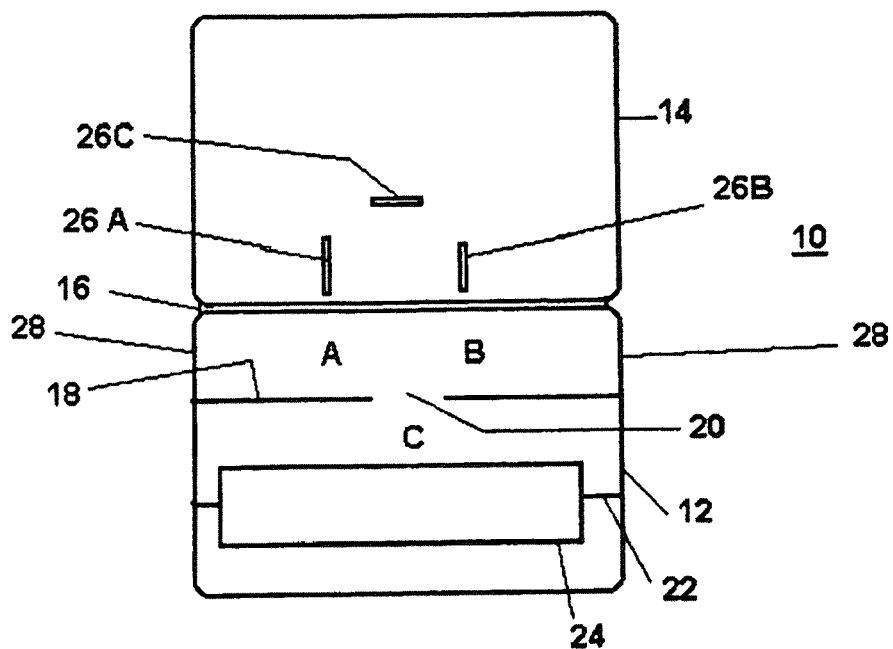
FIG. 1 is a top view showing an apparatus according the present invention with the top fully open.

Referring to FIG. 1, apparatus 10 of the present invention is shown in a fully opened condition. The apparatus includes a lower member 12 and an upper member 14 which Are hinged together at 16 to form a boxlike enclosure that can be swung open and closed. Members 12 and 14 are preferably made of plastic, such as injection molded plastic. A suitable enclosure is available from Bell Laboratories of Madison, Wisconsin and sold under the product name "Protecta Jr. Bait Station". The enclosure is 6"×5 ½" and 3" high. The enclosure has a durable hinge 16 connecting the upper member 14 and the lower member 12 and includes a screw lock to secure the enclosure in a closed condition so that children or larger animals are not able to open the enclosure and reach the contents thereof.

Figure 2:
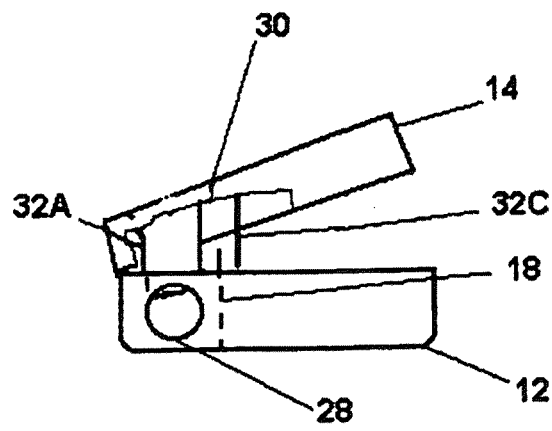
FIG. 2 is a side view of the FIG. 1 apparatus showing the arrangement with the top in a nearly closed condition.
Figures 3, 4:
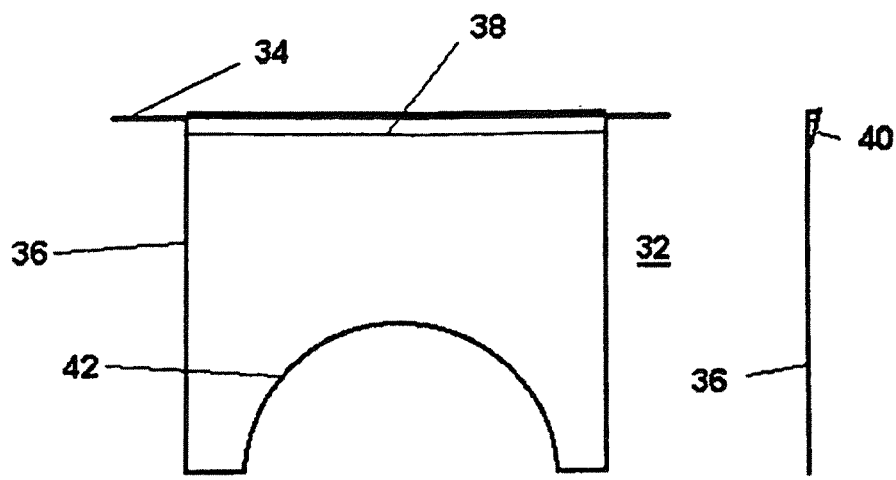
FIG. 3 is a front elevation view of an applicator useful in the FIG. 1 embodiment.
FIG. 4 is a side view of the FIG. 3 applicator.

Lower member 12 includes sidewalls openings 28 which are visible in the side view of FIG. 2 and which are arranged in an appropriate size to permit the entry of a rodent such as a mouse. Inside member 12 there is a provided an interior wall 18 which separates the enclosure into an entry passageway having openings 28 and an inner bait chamber in which there is provided a bait 24. Bait 24 is preferably a solid bait mounted on a steel horizontal rod 22 which keeps the bait off any moisture on the floor of the enclosure. Interior wall 18 has an opening 20 by which a rodent may enter the inner bait chamber. The top cover member 14 is provided with three applicator mounting slots 26a, 26B and 26C. Applicators 32 each comprise a flexible web which is suspended to extend within enclosure 10. Applicator 32 shown in FIG. 3 is arranged to have a fabric web 36 pass through one of slots 26 and to have horizontal support member, comprising metal rod 34, engage the top 14 of enclosure 10 so that the fabric webs 36 of applicators 32 are suspended to hang into regions A, B and C respectively of enclosure 10 when cover 14 is in the closed position. Accordingly, when a rodent enters the chamber and moves through regions A, B or C, the flexible fabric web 36 of the applicator 32 will rub across the fur or skin of the rodent and apply a small amount of the chemical thereon to the skin or fur of the rodent.

In the embodiment shown in FIGS. 1 and 2 the applicators are arranged in positions where a rodent is likely to pass when exploring the inside of the enclosure. In particular, the rodent will be entering by one of openings 28 and be attracted to bait 24 in the inner bait chamber of the enclosure. In reaching the bait 24 the rodent is likely to pass through and contact with either applicator 32A or 32B in the passageway from opening 28 to opening 20 and thereafter also contact applicator 32C while passing through opening 20 and approaching bait 24.

It will be understood by those familiar with the art that different size, shape and configuration of enclosures may be use in accordance with the invention and that the particular location of applicators 32 in such enclosures may be at different locations according to the arrangement of passages in the enclosures.

It should be additionally recognized that it may be advantageous to provide applicators 32 in a configuration wherein they can be easily replaced with new applicators to provide a renewed supply of chemicals.

FIGS. 3 through 14 illustrate various embodiments for applicators and applicator mounting arrangements according to the invention. The applicators shown in FIGS. 3 to 7 include a flexible web which has a horizontal mounting member for engaging the enclosure and from which the flexible web is suspended within the enclosure to rub over a rodent passing through the enclosure. In particular, it is desired to have the web rub over the ear lobes and contact behind the ears of the rodent, a place where rodents cannot remove the chemical.

The applicator 32 of FIGS. 3 and 4 includes a fabric web 36, which may be felt, cotton, wool or similar absorbent web material. A horizontal support rod 34 passes through a loop 40 formed by web 36 at the upper end by seam or glue strip 38. A semicircular cutout 42 at the lower edge of web 36, opposite horizontal support 34 provides a passage which is lower in the height of the opening than the anticipated height of the rodent, so that the fabric of web 36 rubs across the back, head and ears of the rodent passing through.

Figure 5:
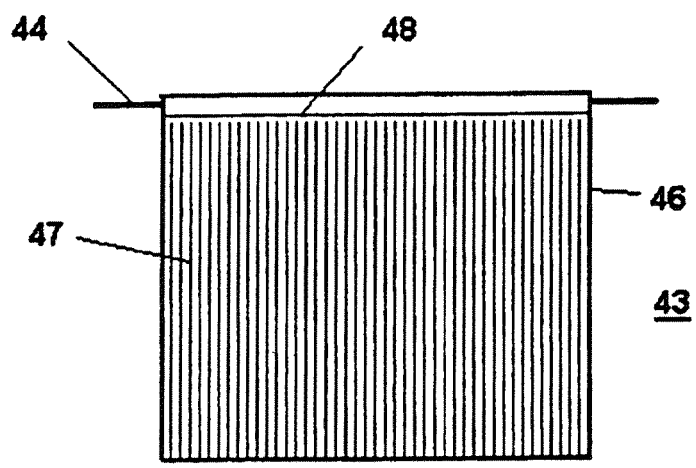
FIG. 5 is a front elevation view of an alternate applicator.

An alternate applicator 43 shown in FIG. 5 includes a web 46 of similar material having vertical slits 47 forming flexible strips which hang into a passageway through which a rodent may pass in the manner of a beaded curtain. The resulting strips of the web 46 likewise rub against the back of a passing rodent. Applicator 43 is suspended from supported 44 which is in a loop formed by seam 48.

Applicators 32 and 43 may be arranged so that their respective webs pass through slots 26 while the support rods engage the top wall 14 of the enclosure.

Figures 6, 7:
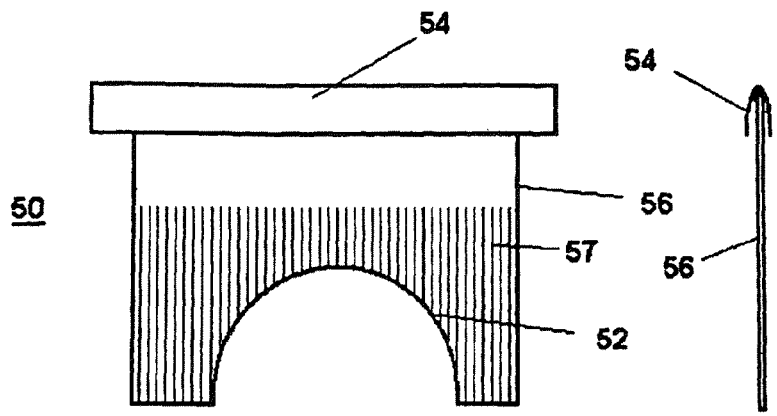
FIG. 6 is a front elevation view of another alternate applicator.
FIG. 7 is a side view of the FIG. 6 applicator.
Figures 8, 9:
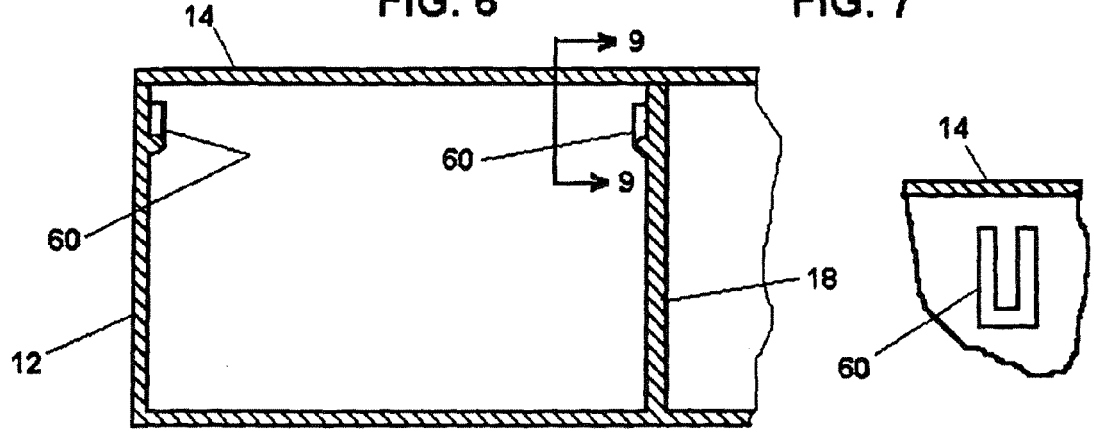
FIG. 8 is a partial cross-sectional view of an enclosure according to an embodiment of the invention.
FIG. 9 is a partial sectional view of the FIG. 8 enclosure.
Figures 10, 11:
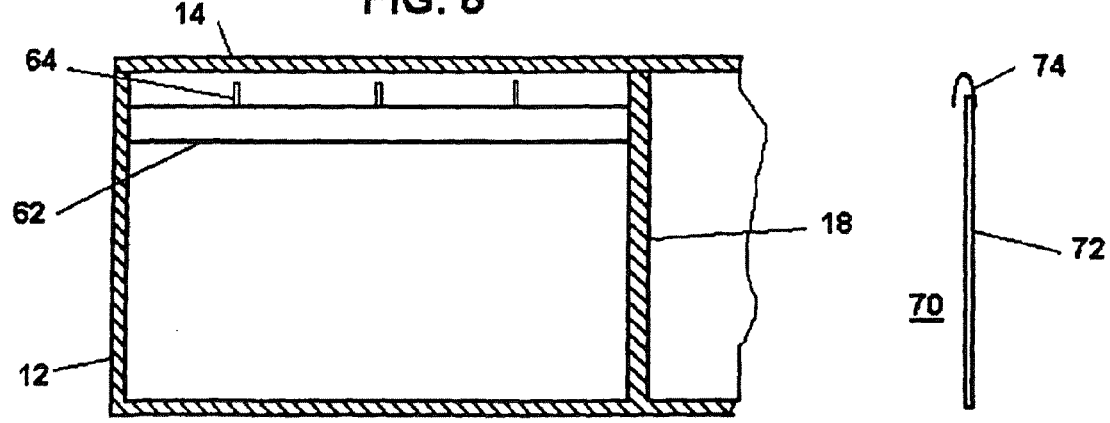
FIG. 10 is a partial sectional view of an alternate enclosure.
FIG. 11 is a side elevation view of an alternate applicator for use with the FIG. 10 enclosure.

Another version of applicator 50 shown in FIGS. 6 and 7 includes both semicircular opening 52 and slits 57 in web 56. Horizontal support 54 may be a U-shaped plastic part to which the web 56 is glued and may sit in top of cover 14 or may be engaged by internal support slots 60 formed on the interior walls of enclosure 10 as shown in FIGS. 8 and 9, Alternatively, a horizontal support bar 62 may be provided across a passageway as shown in FIG. 10, preferably having pointed holders 64 for receiving applicator 70 having web 72 and optionally U-shaped support member 74 as shown in FIG. 11.

Figures 12, 13:
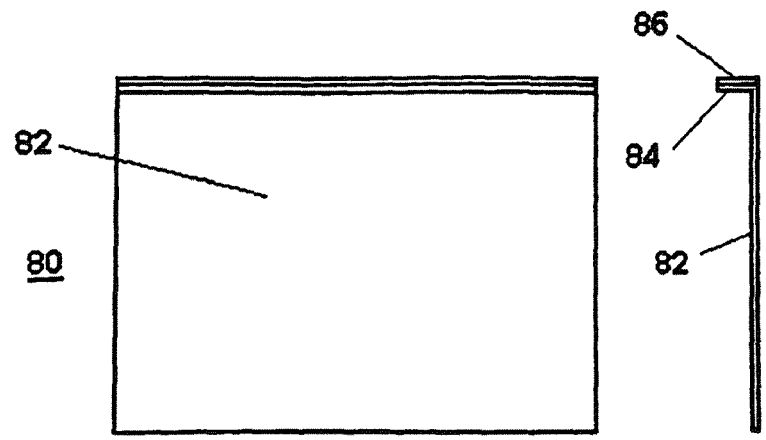
FIG. 12 is a front elevation view of another applicator according to the invention.
FIG. 13 is a side view of the FIG. 12 applicator.

Applicator 80 shown in FIGS. 12 and 13 includes a plane web 82 which is formed with a perpendicular portion 84 at the top edge. An adhesive strip 86 is applied to portion 84 to enable attachment to the interior of top wall 14 of enclosure 10.

Figure 14:
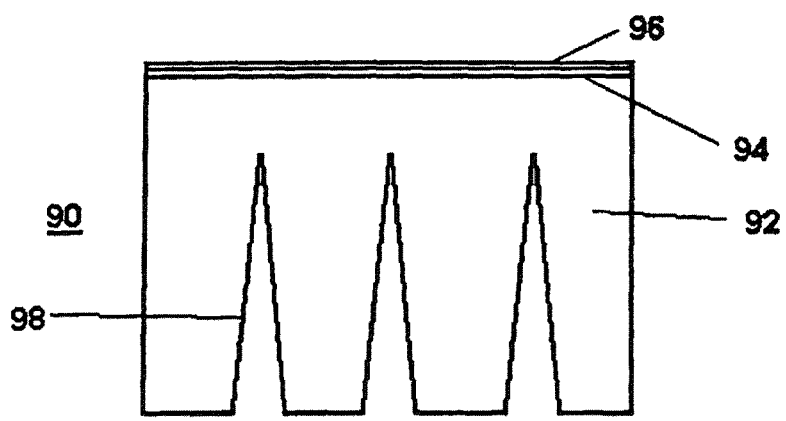
FIG. 14 is a front elevation view of another applicator according to the invention.

Applicator 90 shown in FIG. 14 includes web 94 with perpendicular portion 94 and adhesive strip 96. Cutouts 98, preferably triangular in shape, invite contacting passage by a rodent. The base opening of cutouts 98 along the lower edge of web 92 are arranged to be narrower than the width of a rodent.

The invention claimed is:

1. An apparatus for applying a chemical to a rodent, the apparatus comprising:
   an enclosure with at least one peripheral opening to allow entry of the rodent into the enclosure;
   an interior passageway adjacent the at least one peripheral opening;
   an inner chamber for receiving bait to encourage the rodent to enter the enclosure through the at least one peripheral opening;
   an interior opening connecting the interior passageway to the inner chamber; and
   one or more applicators with the chemical applied thereon, the one or more applicators being positionable within the interior passageway of the enclosure between the at least one peripheral opening and the bait and extending from a top of the passageway to a bottom of the passageway to substantially obstruct the passageway,
   wherein the one or more applicators comprise a flexible portion that can flex when contacted by the rodent, thereby allowing the rodent to move past the one or more applicators
   wherein the enclosure comprises a top wall, and at least one applicator is configured to be suspended from the top wall in the interior passageway between the at least one peripheral opening and the interior opening and at least one applicator is configured to be suspended from the top wall in the inner chamber between the interior opening and the bait,
   wherein the one or more applicators comprise an upper horizontal support member and the flexible portion of the one or more applicators comprise a fabric suspended from the support member, and
   wherein the top wall of the enclosure comprises a plurality of slots that comprise openings that pass through the top wall of the enclosure for receiving applicators, the horizontal support member being larger than the slot to suspend a respective applicator from the top wall.

2. The apparatus of claim 1, further comprising an interior wall between the interior passageway and the inner chamber.

3. The apparatus of claim 1, wherein the fabric includes a plurality of slits to allow passage of the rodent through the fabric.

4. The apparatus of claim 1, wherein the enclosure comprises a first peripheral opening and a second peripheral opening, the first and second peripheral openings being at opposite ends of the interior passageway.

5. The apparatus of claim 3, wherein the fabric comprises a flexible web.

6. The apparatus of claim 1, wherein the fabric includes a plurality of cutouts.

7. The apparatus of claim 6, wherein the plurality of cutouts are triangular in shape.

\* \* \* \* \*